(12) United States Patent
Xu et al.

(10) Patent No.: US 12,267,770 B2
(45) Date of Patent: *Apr. 1, 2025

(54) METHOD AND APPARATUS FOR OBTAINING NETWORK SLICE IDENTIFIER

(71) Applicant: HUAWEI TECHNOLOGIES CO., LTD., Guangdong (CN)

(72) Inventors: Juhua Xu, Nanjing (CN); Shuping Peng, Beijing (CN); Xinjun Chen, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,349

(22) Filed: Mar. 6, 2024

(65) Prior Publication Data

US 2024/0349174 A1 Oct. 17, 2024

Related U.S. Application Data

(63) Continuation of application No. 17/394,235, filed on Aug. 4, 2021, now Pat. No. 11,950,179, which is a
(Continued)

(30) Foreign Application Priority Data

Dec. 31, 2019 (CN) .......................... 201911417814.4

(51) Int. Cl.
*H04W 4/00* (2018.01)
*H04L 61/2592* (2022.01)
(Continued)

(52) U.S. Cl.
CPC ......... *H04W 48/16* (2013.01); *H04L 61/2592* (2013.01); *H04W 48/18* (2013.01)

(58) Field of Classification Search
CPC ....... H04W 48/16; H04W 48/18; H04W 4/24; H04W 40/22; H04L 61/2592; H04L 12/14;
(Continued)

(56) References Cited

U.S. PATENT DOCUMENTS 9,195,491 B2 * 11/2015 Zhang .................... H04L 41/08
10,182,338 B2 * 1/2019 Li .......................... H04W 4/60
(Continued)

FOREIGN PATENT DOCUMENTS

CN 106936783 A 7/2017
CN 107046506 A 8/2017
(Continued)

OTHER PUBLICATIONS

S2-1902005, Huawei et al., 5GLAN communication, 3GPP TSG-SA WG2 Meeting #131, Feb. 25-Mar. 1, 2019, Santa Cruz, Tenerife, ES, total 14 pages.
(Continued)

*Primary Examiner* — Amancio Gonzalez
(74) *Attorney, Agent, or Firm* — WOMBLE BOND DICKINSON (US) LLP

(57) ABSTRACT

Embodiments of this application provide a method and an apparatus for obtaining a network slice identifier. In the method, a wireless access device receives a first service packet sent by a terminal; the wireless access device obtains a second service packet based on the first service packet, where the second service packet includes the first service packet and a network slice identifier; and the wireless access device sends the second service packet to a forwarding device.

19 Claims, 5 Drawing Sheets

Related U.S. Application Data continuation of application No. PCT/CN2020/119852, filed on Oct. 7, 2020.

(51) Int. Cl.
*H04W 48/16* (2009.01)
*H04W 48/18* (2009.01)

(58) Field of Classification Search
CPC ............. H04L 41/5041; H04L 12/4633; H04L 12/4683; H04L 41/0893; H04L 12/4641; H04M 15/61; H04M 15/62; H04M 15/8044; H04M 15/8214
USPC .......................................................... 370/328
See application file for complete search history.

(56) References Cited

U.S. PATENT DOCUMENTS

| | | | | |
|---|---|---|---|---|
| 10,237,722 | B2* | 3/2019 | Chen | H04W 12/35 |
| 10,237,723 | B2* | 3/2019 | Borse | H04B 1/3816 |
| 10,411,964 | B2* | 9/2019 | Zhang | H04L 41/50 |
| 10,506,506 | B2* | 12/2019 | Qiao | H04W 8/18 |
| 10,582,412 | B2* | 3/2020 | Link | H04W 76/11 |
| 10,594,456 | B2* | 3/2020 | Park | H04W 16/28 |
| 10,608,928 | B2* | 3/2020 | Zhang | H04W 24/08 |
| 10,708,761 | B1* | 7/2020 | Yin | H04W 8/205 |
| 10,757,645 | B2* | 8/2020 | Djordjevic | H04W 48/18 |
| 10,771,325 | B2* | 9/2020 | Farmanbar | H04L 41/0816 |
| 10,772,148 | B2* | 9/2020 | Kim | H04W 76/20 |
| 10,834,208 | B2* | 11/2020 | Yu | H04L 67/142 |
| 10,849,135 | B2* | 11/2020 | Ni | H04W 76/10 |
| 10,958,525 | B2* | 3/2021 | Fang | H04L 41/5051 |
| 11,039,359 | B1* | 6/2021 | Paczkowski | H04W 36/12 |
| 11,044,777 | B2* | 6/2021 | Hong | H04W 36/0072 |
| 11,071,086 | B2* | 7/2021 | Park | H04W 68/02 |
| 11,122,470 | B2* | 9/2021 | Park | H04W 36/0055 |
| 11,166,179 | B2* | 11/2021 | Young | H04W 40/24 |
| 11,212,660 | B2* | 12/2021 | Taft | H04W 8/26 |
| 11,212,687 | B2* | 12/2021 | Sharma | H04W 24/08 |
| 11,224,093 | B2* | 1/2022 | Bharatia | H04W 80/10 |
| 11,272,336 | B2* | 3/2022 | Hadadi | H04W 4/50 |
| 11,277,738 | B2* | 3/2022 | Namiranian | H04W 12/0431 |
| 11,310,161 | B2* | 4/2022 | He | G06N 20/00 |
| 11,323,335 | B2* | 5/2022 | Wahlqvist | H04L 41/5019 |
| 11,343,192 | B2* | 5/2022 | Sun | H04W 4/025 |
| 11,363,524 | B2* | 6/2022 | Garcia Azorero | H04W 8/08 |
| 11,395,256 | B2* | 7/2022 | Han | H04W 76/27 |
| 11,516,880 | B2* | 11/2022 | Ni | H04W 48/18 |
| 11,522,830 | B2* | 12/2022 | Kolanowski | H04W 8/20 |
| 11,595,387 | B2* | 2/2023 | Paczkowski | H04W 12/71 |
| 11,743,063 | B2* | 8/2023 | Qiao | H04W 4/24 370/329 |
| 12,069,518 | B2* | 8/2024 | Zhu | H04L 67/14 |
| 2013/0225123 | A1* | 8/2013 | Adjakple | G06Q 20/322 455/406 |
| 2016/0269891 | A1* | 9/2016 | Chen | H04W 76/18 |
| 2017/0054595 | A1* | 2/2017 | Zhang | H04L 41/0896 |
| 2017/0164184 | A1* | 6/2017 | Borse | H04B 1/3816 |
| 2018/0041994 | A1 | 2/2018 | Zhang | |
| 2019/0124704 | A1 | 4/2019 | Sun et al. | |
| 2019/0274015 | A1* | 9/2019 | Surnilla | H04W 76/30 |
| 2019/0289647 | A1 | 9/2019 | Li | |
| 2019/0357119 | A1* | 11/2019 | Hong | H04W 48/02 |
| 2020/0137555 | A1* | 4/2020 | Dos Santos | H04W 8/18 |
| 2021/0058748 | A1* | 2/2021 | Liao | H04W 76/11 |
| 2021/0084009 | A1* | 3/2021 | Du | H04L 45/74 |
| 2021/0392575 | A1* | 12/2021 | Welin | H04W 72/23 |
| 2021/0410107 | A1* | 12/2021 | Park | H04W 76/27 |
| 2022/0394605 | A1* | 12/2022 | Wang | H04W 48/18 |
| 2023/0247716 | A1* | 8/2023 | Hong | H04W 76/27 |

FOREIGN PATENT DOCUMENTS

| | | |
|---|---|---|
| CN | 107517488 A | 12/2017 |
| CN | 109565459 A | 4/2019 |

OTHER PUBLICATIONS

3GPP TS 23.501 V16.3.0 (Dec. 2019), 3rd Generation Partnership Project; Technical Specification Group Services and System Aspects; System architecture for the 5G System (5GS); Stage 2(Release 16), total 417 pages.

S2-1903617 revision of S2-190xxxx), ZTE, Clarification on the CAG ID and slicing, 3GPP TSG-SA WG2 Meeting #132, Xi''an, P.R. of China, Apr. 8-12, 2019, total 12 pages.

3GPP TS 29.060 V15.5.0 (Jun. 2019),3rd Generation Partnership Project; Technical Specification Group Core Network and Terminals;General Packet Radio Service (GPRS);GPRS Tunnelling Protocol (GTP)across the Gn and Gp interface(Release 15), total 194 pages.

* cited by examiner

| Option type | Opt data len | Option data |
|---|---|---|

FIG. 4

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message type | | | | | | | |
| 3 | Length (1st octet) | | | | | | | |
| 4 | Length (2nd octet) | | | | | | | |
| 5 | Tunnel endpoint identifier (1st octet) | | | | | | | |
| 6 | Tunnel endpoint identifier (2nd octet) | | | | | | | |
| 7 | Tunnel endpoint identifier (3rd octet) | | | | | | | |
| 8 | Tunnel endpoint identifier (4th octet) | | | | | | | |
| 9 | Sequence number (1st octet)[1)][4)] | | | | | | | |
| 10 | Sequence number (2nd octet)[1)][4)] | | | | | | | |
| 11 | N-PDU number[2)][4)] | | | | | | | |
| 12 | Next extension header type[3)][4)] | | | | | | | |

FIG. 5

| |
|---|
| Extension header length |
| Extension header content |
| Next extension header type (note) |

FIG. 6

METHOD AND APPARATUS FOR OBTAINING NETWORK SLICE IDENTIFIER

CROSS-REFERENCE TO RELATED APPLICATIONS

This application is a continuation of U.S. patent application Ser. No. 17/394,235, filed on Aug. 4, 2021, which is a continuation of International Application No. PCT/CN2020/119852, filed on Oct. 7, 2020, which claims priority to Chinese Patent Application No. 201911417814.4, filed on Dec. 31, 2019. All of the aforementioned patent applications are hereby incorporated by reference in their entireties.

TECHNICAL FIELD

This application relates to the communications field, and in particular, to a method and an apparatus for obtaining a network slice identifier.

BACKGROUND

In a 5th generation (5G) communications era, hundreds of billions of internet of things devices access a network, and different application scenarios have different requirements on the network. In a network slicing technology, network environments isolated from each other are provided for different application scenarios by virtualizing an independent logical network on a same network infrastructure, so that network functions and features can be customized for the different application scenarios based on their respective requirements, to ensure requirements of different services.

Currently, a core network (CN) device selects a proper network slice for a terminal and associates the terminal with the proper network slice. In other words, the CN device allocates a network slice identifier (NSID) to the terminal. For example, in a process in which the terminal registers with a global public land mobile network (PLMN), the CN device selects a network slice for the terminal based on subscription information of the terminal. When the terminal needs to access a matched network slice, the terminal may request the network for single network slice selection assistance information (S-NSSAI). The S-NSSAI is used by the network to select a proper access and mobility management function (AMF) entity for the terminal, so that the terminal can access the matched network slice. The S-NSSAI is used as an NSID. However, currently, a method for a terminal to provide S-NSSAI for a network has relatively poor scalability and convenience.

SUMMARY

Embodiments of this application provide a method and an apparatus for obtaining a network slice identifier. This helps improve scalability and convenience of providing the network slice identifier.

According to a first aspect, a method for obtaining a network slice identifier is provided. The method includes: a wireless access device receives a first service packet sent by a terminal; the wireless access device obtains a second service packet based on the first service packet, where the second service packet includes the first service packet and a network slice identifier; and the wireless access device sends the second service packet to a forwarding device.

In the foregoing method, the wireless access device may add the network slice identifier to a service packet from the terminal, for example, the first service packet from the terminal, to obtain the second service packet. In this way, the forwarding device that receives the second service packet can obtain the network slice identifier from the received second service packet. This helps improve scalability and convenience of providing the network slice identifier.

In one embodiment, that the wireless access device obtains a second service packet based on the first service packet includes: the wireless access device obtains a first identifier based on the first service packet, where the first identifier is used to identify a service of a subscriber; and the wireless access device obtains the second service packet based on the first identifier, the first service packet, and a correspondence, where the correspondence includes the network slice identifier and the first identifier, the second service packet includes tunnel encapsulation, and the tunnel encapsulation includes the network slice identifier.

In one embodiment, the first identifier includes at least one of a service identifier and an identifier of the subscriber. When a plurality of subscribers of the terminal subscribe to a plurality of services, a service of a subscriber may be distinguished from other services by using a service identifier and an identifier of the subscriber. When a subscriber of the terminal subscribes to a plurality of services, a service of the subscriber may be distinguished from other services by using a service identifier. When a plurality of subscribers of the terminal subscribe to specific services, a specific service subscribed to by a subscriber may be distinguished from other services by using an identifier of the subscriber.

In one embodiment, that the wireless access device obtains a second service packet based on the first service packet includes: the wireless access device obtains the network slice identifier from the first service packet, where the first service packet includes the network slice identifier; and the wireless access device performs tunnel encapsulation on the first service packet, to obtain the second service packet, where the tunnel encapsulation includes the network slice identifier.

In one embodiment, the method further includes: the wireless access device receives the correspondence sent by a user profile function (UPF).

In one embodiment, the tunnel encapsulation includes an internet protocol version 6 (IPv6) extension header, and the IPv6 extension header includes the network slice identifier.

In one embodiment, the IPv6 extension header includes a hop-by-hop options header, the hop-by-hop options header includes an option type and option data, the option type is used to identify a type of a network slice identifier, and the option data is used to carry the network slice identifier.

In one embodiment, the tunnel encapsulation includes a general packet radio service tunneling protocol user plane GTP-U (GTP-U) header, the GTP-U header includes extension header content, and the extension header content is used to carry the network slice identifier.

According to a second aspect, a method for obtaining a network slice identifier is provided. The method includes: a forwarding device receives a second service packet sent by a wireless access device, where the second service packet includes a first service packet and a network slice identifier; the forwarding device obtains the network slice identifier from the second service packet; and the forwarding device leads, based on the network slice identifier, the second service packet into a network slice corresponding to the network slice identifier.

In the foregoing method, the forwarding device may obtain the network slice identifier from the second service packet. This helps improve scalability and convenience of providing the network slice identifier.

In one embodiment, that the forwarding device leads, based on the network slice identifier, the second service packet into a network slice corresponding to the network slice identifier includes: the forwarding device obtains, based on the network slice identifier and a correspondence, a network resource corresponding to the network slice; and the forwarding device sends the second service packet by using the network resource corresponding to the network slice.

In one embodiment, the second service packet includes an IPv6 extension header, and the IPv6 extension header includes the network slice identifier.

In one embodiment, the IPv6 extension header includes a hop-by-hop options header, the hop-by-hop options header includes an option type and option data, the option type is used to identify a type of a network slice identifier, and the option data is used to carry the network slice identifier.

In one embodiment, the tunnel encapsulation includes a GTP-U header, the GTP-U header includes extension header content, and the extension header content is used to carry the network slice identifier.

According to a third aspect, an apparatus for obtaining a network slice identifier is provided. The apparatus is disposed in a wireless access device. The apparatus includes: a receiving unit, configured to receive a first service packet sent by a terminal; an obtaining unit, configured to obtain a second service packet based on the first service packet, where the second service packet includes the first service packet and a network slice identifier; and a sending unit, configured to send the second service packet to a forwarding device.

In one embodiment, the obtaining unit is specifically configured to: obtain a first identifier based on the first service packet, where the first identifier is used to identify a service of a subscriber; and obtain the second service packet based on the first identifier, the first service packet, and a correspondence, where the correspondence includes the network slice identifier and the first identifier, the second service packet includes tunnel encapsulation, and the tunnel encapsulation includes the network slice identifier.

In one embodiment, the first identifier includes at least one of a service identifier and an identifier of the subscriber.

In one embodiment, the receiving unit is further configured to receive the correspondence sent by a UPF.

In one embodiment, the tunnel encapsulation includes an IPv6 extension header, and the IPv6 extension header includes the network slice identifier.

In one embodiment, the IPv6 extension header includes a hop-by-hop options header, the hop-by-hop options header includes an option type and option data, the option type is used to identify a type of a network slice identifier, and the option data is used to carry the network slice identifier.

In one embodiment, the tunnel encapsulation includes a GTP-U header, the GTP-U header includes extension header content, and the extension header content is used to carry the network slice identifier.

According to a fourth aspect, an apparatus for obtaining a network slice identifier is provided. The apparatus is disposed in a forwarding device. The apparatus includes: a receiving unit, configured to receive a second service packet sent by a wireless access node, where the second service packet includes a first service packet and a network slice identifier; an obtaining unit, configured to obtain the network slice identifier from the second service packet; and a processing unit, configured to lead, based on the network slice identifier, the second service packet into a network slice corresponding to the network slice identifier.

In one embodiment, the processing unit is specifically configured to: obtain, based on the network slice identifier and a correspondence, a network resource corresponding to the network slice; and send the second service packet by using the network resource corresponding to the network slice.

In one embodiment, the second service packet includes an IPv6 extension header, and the IPv6 extension header includes the network slice identifier.

In one embodiment, the IPv6 extension header includes a hop-by-hop options header, the hop-by-hop options header includes an option type and option data, the option type is used to identify a type of a network slice identifier, and the option data is used to carry the network slice identifier.

In one embodiment, the tunnel encapsulation includes a GTP-U header, the GTP-U header includes extension header content, and the extension header content is used to carry the network slice identifier.

According to a fifth aspect, a computer-readable storage medium is provided. The computer-readable storage medium includes instructions, and when the instructions are run on a computer, the computer is enabled to perform the method for obtaining a network slice identifier in any one of the first aspect or the possible designs of the first aspect.

According to a sixth aspect, a computer-readable storage medium is provided. The computer-readable storage medium includes instructions, and when the instructions are run on a computer, the computer is enabled to perform the method for obtaining a network slice identifier in any one of the second aspect or the possible designs of the second aspect.

According to a seventh aspect, a computer program product including instructions is provided. When the computer program product is run on a computer, the computer is enabled to perform the method for obtaining a network slice identifier in any one of the first aspect or the possible designs of the first aspect.

According to an eighth aspect, a computer program product including instructions is provided. When the computer program product is run on a computer, the computer is enabled to perform the method for obtaining a network slice identifier in any one of the second aspect or the possible designs of the second aspect.

According to a ninth aspect, an apparatus for obtaining a network slice identifier is provided. The apparatus includes: a processor, a memory, a bus, and a communications interface. The memory is configured to store computer-executable instructions, and the processor is connected to the memory through the bus. When the apparatus runs, the processor executes the computer-executable instructions stored in the memory, so that the apparatus is enabled to perform the method for obtaining a network slice identifier in any one of the first aspect and the possible designs of the first aspect. The apparatus may be the wireless access device in any one of the first aspect or the possible designs of the first aspect.

According to a tenth aspect, an apparatus for obtaining a network slice identifier is provided. The apparatus includes: a processor, a memory, a bus, and a communications interface. The memory is configured to store computer-executable instructions, and the processor is connected to the memory through the bus. When the apparatus runs, the processor executes the computer-executable instructions stored in the memory, so that the apparatus is enabled to perform the method for obtaining a network slice identifier in any one of the second aspect and the possible designs of the second aspect. The apparatus may be the forwarding device in any one of the second aspect or the possible designs of the second aspect.

According to an eleventh aspect, a system for obtaining a network slice identifier is provided. The system includes the apparatus provided in the third aspect or the ninth aspect, and the apparatus provided in the fourth aspect or the tenth aspect.

BRIEF DESCRIPTION OF DRAWINGS

FIG. 4 is a schematic diagram of an IPv6 extension header according to an embodiment of this application;

FIG. 5 is a schematic diagram of a packet encapsulation format according to an embodiment of this application;

FIG. 6 is a schematic diagram of a GTP extension header according to an embodiment of this application;

DESCRIPTION OF EMBODIMENTS

The following describes embodiments of the present application with reference to the accompanying drawings.

An embodiment of this application provides a method for obtaining a network slice identifier. In the method, a wireless access device receives a first service packet sent by a terminal; the wireless access device obtains a second service packet based on the first service packet, where the second service packet includes the first service packet and a network slice identifier; and the wireless access device sends the second service packet to a forwarding device. The forwarding device receives the second service packet sent by the wireless access device; the forwarding device obtains the network slice identifier from the second service packet; and the forwarding device imports, based on the network slice identifier, the second service packet into a network slice corresponding to the network slice identifier.

Figure 1:
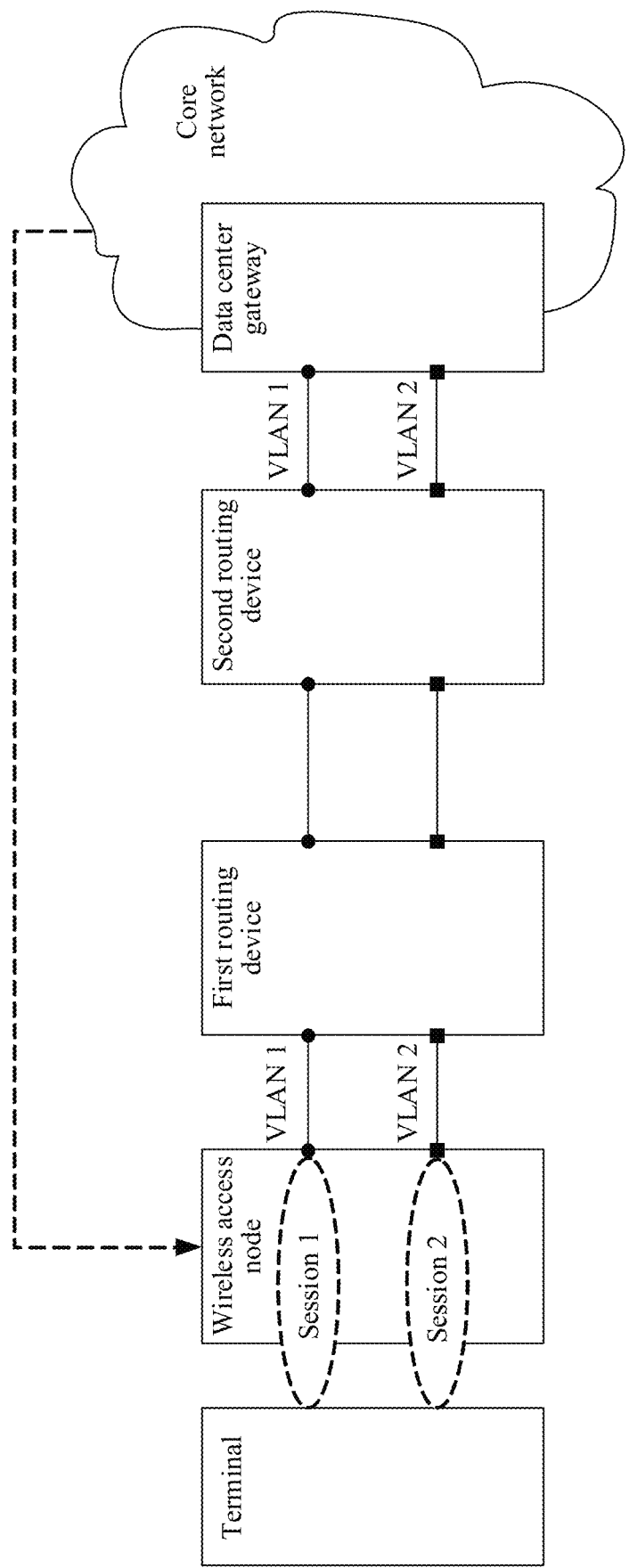
FIG. 1 is a schematic diagram of a network scenario according to an embodiment of this application.

FIG. 1 is a schematic diagram of a network scenario according to an embodiment of this application. In the network scenario shown in FIG. 1, a port and a link that correspond to a VLAN 1 belong to a network slice 1. The network slice 1 corresponds to a service 1. A port and a link that correspond to a VLAN 2 belong to a network slice 2. The network slice 2 corresponds to a service 2. The network slice 1 and the network slice 2 are obtained by logically dividing an access network, a transmission network, and a core network. The network slice 1 and the network slice 2 are specific representation forms of network slice identifiers. This is not limited in this embodiment of this application.

Both a session 1 and a session 2 may be protocol data unit (PDU) sessions. A service packet from an enhanced mobile broadband (eMBB) application, ultra-reliable low-latency communication (URLLC) application, or a massive internet of things (MIoT) application of a terminal may be imported into a corresponding network slice by using different sessions. The service packet mentioned in this embodiment of this application may belong to any one of the foregoing applications, or may belong to another application. This is not limited in this embodiment of this application.

Figure 2:
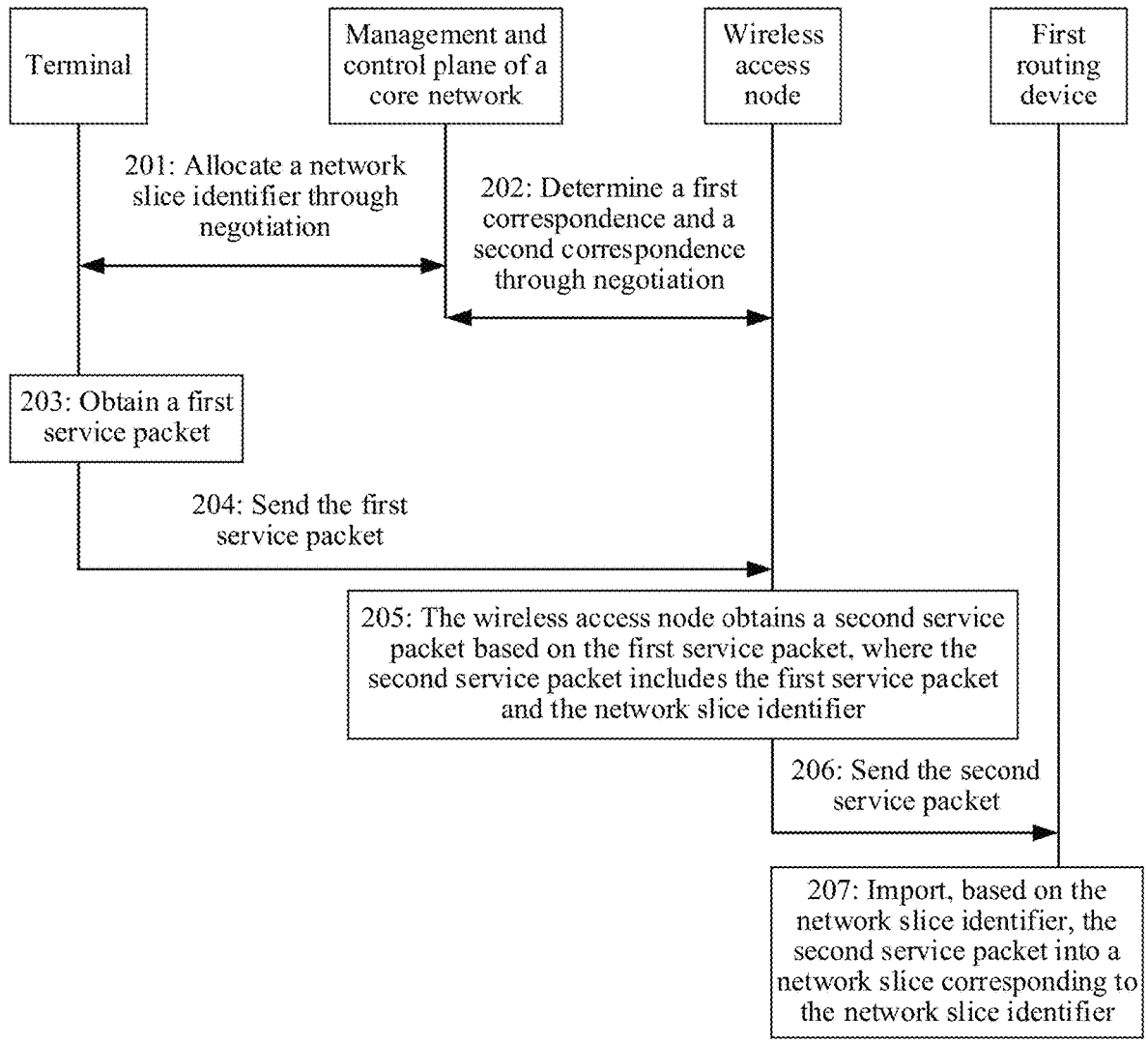
FIG. 2 is a schematic flowchart of a method for obtaining a network slice identifier according to an embodiment of this application.

FIG. 2 is a schematic flowchart of a method for obtaining a network slice identifier according to an embodiment of this application. The following describes the method for obtaining a network slice identifier according to an embodiment of this application with reference to FIG. 1.

201: A management and control plane of the core network negotiates with a terminal, to allocate a network slice identifier to the terminal.

For example, the management and control plane of the core network may allocate the network slice identifier to the terminal based on subscription information of a subscriber, for example, one or more of an identifier of the subscriber and a service identifier. When a plurality of subscribers of the terminal subscribe to a plurality of services, a service of a subscriber may be distinguished from other services by using a service identifier and an identifier of the subscriber. When a subscriber of the terminal subscribes to a plurality of services, a service of the subscriber may be distinguished from other services by using a service identifier. When a plurality of subscribers of the terminal subscribe to specific services, a specific service subscribed to by a subscriber may be distinguished from other subscribers by using an identifier of the subscriber. In the scenario shown in FIG. 1, both the service 1 and the service 2 are a plurality of services subscribed to by a subscriber to which the terminal belongs. A network slice identifier allocated to the service 1 is a network slice identifier 1, and a network slice identifier allocated to the service 2 is a network slice identifier 2. In one embodiment, the management and control plane of the core network may be an access and mobility management function (AMF), and the AMF may send a network slice identifier and a service identifier corresponding to the network slice identifier to the terminal. In the scenario shown in FIG. 1, the management and control plane of the core network sends, to the terminal, a correspondence including the network slice identifier 1 and an identifier of the service 1, and also sends, to the terminal, a correspondence including the network slice identifier 2 and an identifier of the service 2. For related content of obtaining, by the terminal, a network slice identifier, refer to the 3GPP TS 23.501. In another embodiment, the AMF may send a first identifier to the terminal. The first identifier includes one or more of the service identifier and the identifier of the subscriber. When sending a service packet to a wireless access device, the terminal may send the first identifier and the service packet together to the wireless access device by using a PDU session, or the terminal may add the first identifier to the service packet, and then send the service packet to the wireless access device.

For example, the network slice identifier may be single network slice selection assistance information (S-NSSAI). The S-NSSAI includes a slice/service type (SST) and a slice differentiator (SD). A value 1 of the SST indicates eMBB. A value 2 of the SST indicates URLLC. A value 3 of the SST indicates MIoT. When SSTs included in two network slice identifiers are the same, different network slices may be distinguished by using SDs included in the network slice identifiers.

202: A wireless access node negotiates with the management and control plane of the core network, to determine a first correspondence and a second correspondence.

The wireless access node in this embodiment of this application may be a base station or another device that can access a wireless network. This is not limited in this embodiment of this application. The first correspondence includes the first identifier and the network slice identifier. The second correspondence includes the network slice identifier and a tunnel identifier. The tunnel identifier is used to identify a tunnel port.

For example, the wireless access node negotiates with the management and control plane of the core network, to establish a tunnel. The tunnel may specifically be a GPRS tunneling protocol (GTP) tunnel. For details, refer to the 3GPP TS 29.060 protocol. The wireless access node and the management and control plane of the core network each store the second correspondence. In the scenario shown in FIG. 1, a connection line with solid dots at two ends is used to represent a first tunnel, and a connection line with solid squares at two ends is used to represent a second tunnel. The wireless access node and the management and control plane of the core network store a correspondence between the network slice identifier 1 and an identifier of the first channel. The wireless access node and the management and control plane of the core network store a correspondence between the network slice identifier 2 and an identifier of the second channel.

203: The terminal obtains a first service packet.

For example, the terminal may obtain a service packet of a service, and the service packet of the service may be identified by using a service identifier carried in the service packet. The service identifier may be a multi-tuple, for example, a 2-tuple or a 5-tuple. The service identifier may alternatively be a specific identifier or field. A specific representation form of the service identifier is not limited in this embodiment of this application. In one embodiment, the terminal may add the network slice identifier to the service packet based on a correspondence that is between the service identifier and the network slice identifier and that is delivered by the management and control plane of the core network, to obtain the first service packet. In the scenario shown in FIG. 1, the terminal may add, based on the correspondence between the network slice identifier 1 and a service identifier 1, the network slice identifier 1 to a service packet that carries the service identifier 1. The terminal may add, based on the correspondence between the network slice identifier 2 and a service identifier 2, the network slice identifier 2 to a service packet that carries the service identifier 2. In another embodiment, the terminal may add the first identifier delivered by the management and control plane of the core network or the first identifier configured in another manner to the service packet, to obtain the first service packet. In the scenario shown in FIG. 1, the terminal may add the identifier of the subscriber to the service packet that carries the service identifier 1. The terminal may also add the identifier of the subscriber to the service packet that carries the service identifier 2.

204: The terminal sends the first service packet to the wireless access node.

For example, a session corresponding to a service may be established between the terminal and the wireless access node. The terminal may send the first service packet to the wireless access node by using the established session corresponding to the service. In one embodiment, in the network scenario shown in FIG. 1, the terminal may send, to the wireless access node by using a session 1, a service packet that carries the network slice identifier 1. The terminal may send, to the wireless access node by using a session 2, a service packet that carries the network slice identifier 2. In another embodiment, in the network scenario shown in FIG. 1, the terminal may send, to the wireless access node by using the session 1, the service packet that carries the service identifier 1. The terminal may send, to the wireless access node by using the session 2, the service packet that carries the service identifier 2. The service packet that carries the service identifier 1 and the service packet that carries the service identifier 2 may further include the identifier of the subscriber.

205: The wireless access node obtains a second service packet based on the first service packet, where the second service packet includes the first service packet and the network slice identifier.

In one embodiment, the wireless access device obtains the network slice identifier from the first service packet, where the first service packet includes the network slice identifier. The wireless access device performs tunnel encapsulation on the first service packet, to obtain the second service packet, where the tunnel encapsulation includes the network slice identifier. The wireless access node may perform corresponding tunnel encapsulation on the first service packet based on the tunnel identifier and the network slice identifier, where the tunnel encapsulation includes the network slice identifier. In the scenario shown in FIG. 1, the wireless access node may obtain the network slice identifier 1 from the service packet that carries the network slice identifier 1. The wireless access node may perform tunnel encapsulation on the service packet that is from the terminal and that carries the service identifier 1, where the tunnel encapsulation includes the network slice identifier 1. The wireless access node may obtain the network slice identifier 2 from the service packet that carries the network slice identifier 2. The wireless access node may perform tunnel encapsulation on the service packet that is from the terminal and that carries the service identifier 2, where the tunnel encapsulation includes the network slice identifier 2.

In another embodiment, the wireless access device obtains the first identifier based on the first service packet. The first identifier may be carried in the first service packet, or the first identifier may be determined based on multi-tuple information included in the first service packet. The wireless access device obtains the network slice identifier based on the first identifier and the first correspondence. The first correspondence includes the network slice identifier and the first identifier. The wireless access device may perform tunnel encapsulation on the first service packet, to obtain the second service packet. The second service packet includes tunnel encapsulation, and the tunnel encapsulation includes the network slice identifier.

Figure 3:
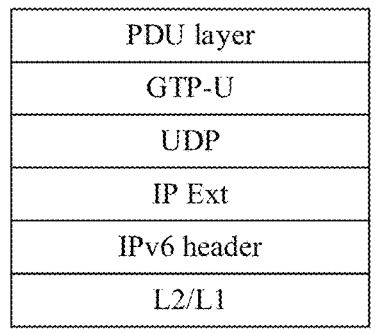
FIG. 3 is a schematic diagram of a packet encapsulation format according to an embodiment of this application.

For example, the tunnel encapsulation may use a structure shown in FIG. 3. In a packet format shown in FIG. 3, IP Ext is an IPv6 extension header, and may be used to carry the network slice identifier, so that a routing device that receives the service packet and that is used as a head node directly reads the network slice identifier. FIG. 4 shows an extension field included in the IP Ext in FIG. 3. The extension field may be carried in a hop-by-hop options header or a destination options header. An option type included in the extension field may be used to identify S-NSSAI. An option data length is 4 bytes, and option data may be used to carry an SST and an SD.

For example, the tunnel encapsulation may use a structure shown in FIG. 5. In a packet format shown in FIG. 5, a tunnel endpoint identifier of the 8th byte is used to carry a GTP extension header. The GTP extension header is used to carry the network slice identifier, so that the routing device that receives the service packet and that is used as the head node reads the network slice identifier in the GTP extension header in a deeper level. As shown in FIG. 6, the network slice identifier may be carried in an extension header content field included in the GTP extension header.

206: The wireless access node sends the second service packet to a first routing device.

For example, the wireless access node may obtain the tunnel identifier based on the network slice identifier and the second correspondence, where the second correspondence includes the network slice identifier and the tunnel identifier. The wireless access node sends the second service packet through a tunnel corresponding to the tunnel identifier. In the scenario shown in FIG. 1, the wireless access node may send the service packet that carries the network slice identifier 1 to the first routing device through the first tunnel, for example, a tunnel corresponding to the VLAN 1. The wireless access node may send the service packet that carries the network slice identifier 2 to the first routing device through the second tunnel, for example, a tunnel corresponding to the VLAN 2.

207: The first routing device imports, based on the network slice identifier, the second service packet into a network slice corresponding to the network slice identifier.

For example, after receiving the second service packet, the first routing device obtains the network slice identifier from the second service packet; and the first routing device sends the second service packet by using the network slice corresponding to the network slice identifier. In the scenario shown in FIG. 1, the first routing device may import, into the tunnel corresponding to the VLAN 1, the service packet that carries the network slice identifier 1. The first routing device may import, into the tunnel corresponding to the VLAN 2, the service packet that carries the network slice identifier 2. In this way, a routing device may obtain a network slice identifier from a packet header. This simplifies a process of obtaining the network slice identifier.

Figure 7:
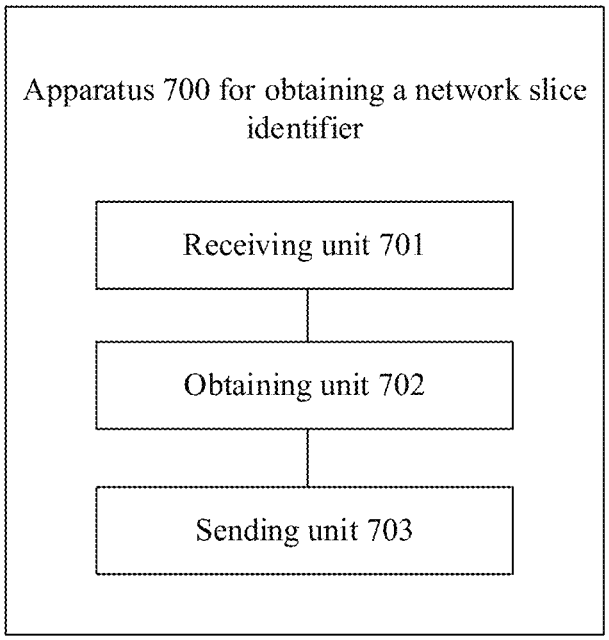
FIG. 7 is a schematic structural diagram of an apparatus for obtaining a network slice identifier according to an embodiment of this application.

FIG. 7 is a schematic structural diagram of an apparatus for obtaining a network slice identifier according to an embodiment of this application. An apparatus 700 for obtaining a network slice shown in FIG. 7 may be disposed in the wireless access node in the embodiments corresponding to FIG. 1 and FIG. 2. The apparatus 700 is described from a perspective of a logical structure. The apparatus 700 includes a receiving unit 701, an obtaining unit 702, and a sending unit 703. The receiving unit 701 is configured to receive a first service packet sent by a terminal. The obtaining unit 702 is configured to obtain a second service packet based on the first service packet, where the second service packet includes the first service packet and a network slice identifier. The sending unit 703 is configured to send the second service packet to a forwarding device. The receiving module 701 is configured to support the apparatus 700 to perform operation 204 in the embodiment corresponding to FIG. 2. The obtaining module 702 is configured to support the apparatus 700 to perform operation 205 in the embodiment corresponding to FIG. 2. The sending module 703 is configured to support the apparatus 700 to perform operation 206 in the embodiment corresponding to FIG. 2.

In one embodiment, the obtaining unit 702 is specifically configured to: obtain a first identifier based on the first service packet, where the first identifier is used to identify a service of a subscriber; and obtain the second service packet based on the first identifier, the first service packet, and a correspondence, where the correspondence includes the network slice identifier and the first identifier, the second service packet includes tunnel encapsulation, and the tunnel encapsulation includes the network slice identifier. The first identifier includes at least one of a service identifier and an identifier of the subscriber.

In another embodiment, the obtaining unit 702 is specifically configured to: obtain the network slice identifier from the first service packet, where the first service packet includes the network slice identifier; and perform tunnel encapsulation on the first service packet, to obtain the second service packet, where the tunnel encapsulation includes the network slice identifier.

In one embodiment, the receiving unit 701 is further configured to receive the correspondence sent by a UPF. The correspondence is the first correspondence in the embodiment corresponding to FIG. 2.

For example, for a tunnel encapsulation manner, refer to corresponding content in the embodiment corresponding to FIG. 2. Details are not described herein again.

Figure 8:
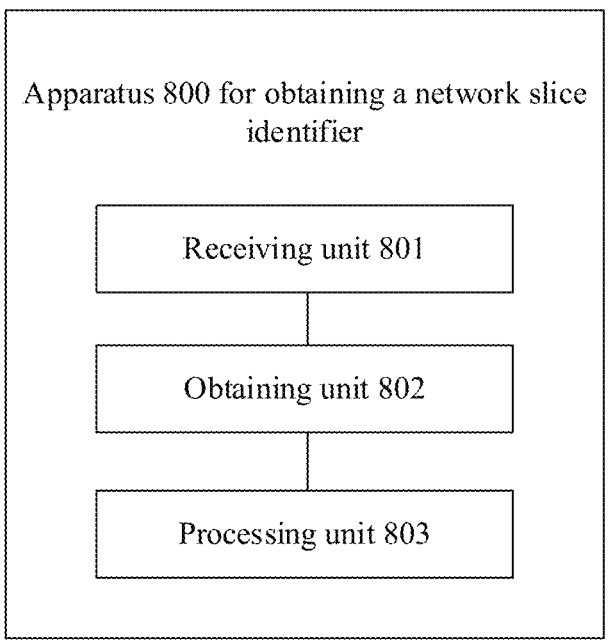
FIG. 8 is a schematic structural diagram of an apparatus for obtaining a network slice identifier according to an embodiment of this application.

FIG. 8 is a schematic structural diagram of an apparatus for obtaining a network slice identifier according to an embodiment of this application. An apparatus 800 for obtaining a network slice identifier shown in FIG. 8 may be disposed in the first routing device in the embodiment corresponding to FIG. 1 or FIG. 2. The apparatus 800 is described from a perspective of a logical structure. The apparatus 800 includes a receiving unit 801, an obtaining unit 802, and a processing unit 803. The receiving unit 801 is configured to receive a second service packet sent by a wireless access device, where the second service packet includes a first service packet and a network slice identifier. The obtaining unit 802 is configured to obtain the network slice identifier from the second service packet. The processing unit 803 is configured to import, based on the network slice identifier, the second service packet into a network slice corresponding to the network slice identifier. The receiving module 801 is configured to support the apparatus 800 to perform operation 206. The obtaining module 802 and the processing unit 803 are configured to support the apparatus 800 to perform operation 207.

For example, the processing unit 803 is specifically configured to: obtain, based on the network slice identifier and a correspondence, a network resource corresponding to the network slice; and send the second service packet by using the network resource corresponding to the network slice.

Figure 9:
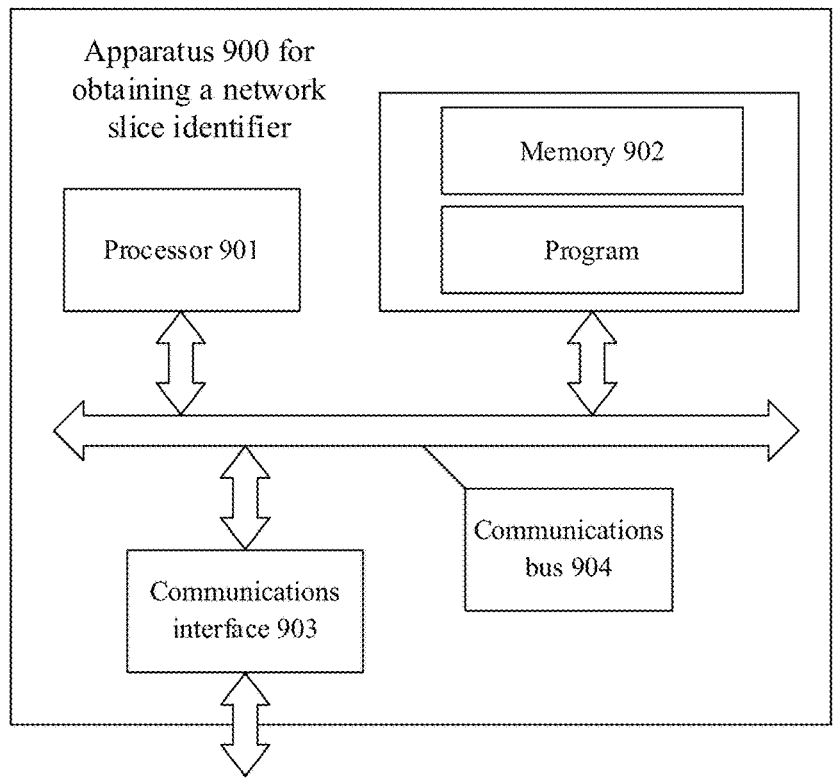
FIG. 9 is a schematic structural diagram of an apparatus for obtaining a network slice identifier according to an embodiment of this application.

FIG. 9 is a schematic structural diagram of an apparatus for obtaining a network slice identifier according to an embodiment of this application. The apparatus 900 provided in the embodiment corresponding to FIG. 9 may be the apparatus 700 provided in the embodiment corresponding to FIG. 7. The apparatus 900 provided in the embodiment corresponding to FIG. 9 is described from a perspective of a hardware structure. The apparatus 900 provided in the embodiment corresponding to FIG. 9 may implement a function of the wireless access node in the embodiment corresponding to FIG. 2. The apparatus 900 provided in the embodiment corresponding to FIG. 9 includes a processor 901, a memory 902, a communications bus 904, and a communications interface 903. The processor 901, the memory 902, and the communications interface 903 are connected through the communications bus 904. The memory 902 is configured to store a program. The processor 901 performs, according to executable instructions included in the program read from the memory 902, the method performed by the wireless access node in the embodiment corresponding to FIG. 2. The processor 901 may negotiate and communicate with a terminal and a first routing device through the communications interface 903.

The communications interface 903 is configured to support the apparatus 900 to perform operation 204 in the embodiment corresponding to FIG. 2. The communications interface 903 is further configured to support the apparatus 900 to perform operation 206 in the embodiment corresponding to FIG. 2. The processor 901 is configured to support the apparatus 900 to perform operation 205 in the embodiment corresponding to FIG. 2.

Figure 10:
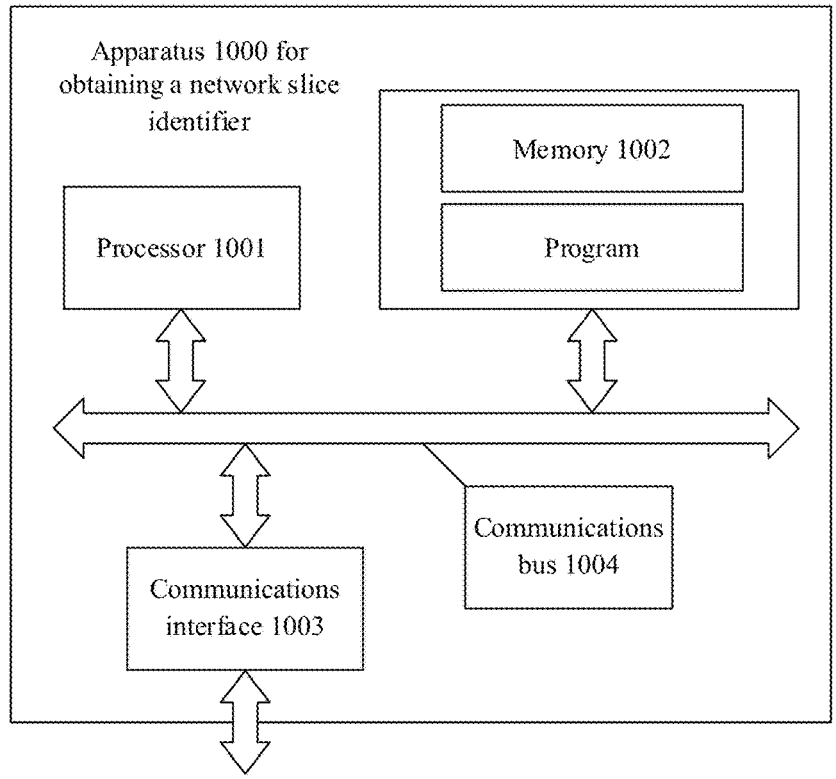
FIG. 10 is a schematic structural diagram of an apparatus for obtaining a network slice identifier according to an embodiment of this application.

FIG. 10 is a schematic structural diagram of an apparatus for obtaining a network slice identifier according to an embodiment of this application. An apparatus 1000 provided in the embodiment corresponding to FIG. 10 may be the apparatus 800 provided in the embodiment corresponding to FIG. 8. The apparatus 1000 provided in the embodiment corresponding to FIG. 10 is described from a perspective of a hardware structure. The apparatus 1000 provided in the embodiment corresponding to FIG. 10 may implement a function of the first routing device in the embodiment corresponding to FIG. 2. The apparatus 1000 provided in the embodiment corresponding to FIG. 10 includes a processor 1001, a memory 1002, a communications bus 1004, and a communications interface 1003. The processor 1001, the memory 1002, and the communications interface 1003 are connected through the communications bus 1004. The memory 1002 is configured to store a program. The processor 1001 performs, according to executable instructions included in the program read from the memory 1002, the method performed by the first routing device in the embodiment corresponding to FIG. 2. The processor 1001 may negotiate and communicate with a wireless access node through the communications interface 1003.

The communications interface 1003 is configured to support the apparatus 1000 to perform operation 206 in the embodiment corresponding to FIG. 2. The processor 1001 is configured to support the apparatus 1000 to perform operation 207 in the embodiment corresponding to FIG. 2.

An embodiment of this application provides a system for obtaining a network slice identifier. The system includes a wireless access device and a forwarding device. The apparatus 700 for obtaining a network slice identifier or the apparatus 900 for obtaining a network slice identifier may be disposed in the wireless access device. The apparatus 800 for obtaining a network slice identifier or the apparatus 1000 for obtaining a network slice identifier may be disposed in the forwarding device. The wireless access device may perform an action performed by the wireless access node in the embodiment corresponding to FIG. 2. The forwarding device may perform an action performed by the first routing device in the embodiment corresponding to FIG. 2.

The general-purpose processor mentioned in the embodiments of this application may be a microprocessor, or the processor may be any conventional processor. The operations of the methods disclosed with reference to the embodiments of the present application may be directly performed by a combination of hardware and software modules in the processor. When software is used for implementation, code that implements the foregoing functions may be stored in a computer-readable medium. The computer-readable medium includes a computer storage medium. The storage medium may be any available medium accessible by a computer. The following is used as an example but is not limited: The computer-readable medium may be a random access memory (RAM), a read-only memory (ROM), an electrically erasable programmable read-only memory (EEPROM), a compact disc read-only memory (CD-ROM) or another compact disc storage, a magnetic disk storage medium or another magnetic storage device, or any other medium that can be used to carry or store expected program code in an instruction or data structure form and can be accessed by a computer. The computer-readable medium may be a compact disc (CD), a laser disc, a digital video disc (DVD), a floppy disk, or a Blu-ray disc.

The embodiments in this specification are all described in a progressive manner. For same or similar parts in the embodiments, refer to these embodiments. Each embodiment focuses on a difference from other embodiments. Especially, a system embodiment is basically similar to a method embodiment, and therefore is described briefly. For related parts, refer to the description in the method embodiment part.

The invention claimed is:

1. A method of obtaining a network slice identifier, comprising:
   receiving, by a wireless access device, a first service packet;
   obtaining, by the wireless access device, a second service packet based on the first service packet, wherein the second service packet comprises the first service packet and a network slice identifier; and
   sending, by the wireless access device, the second service packet based on the network slice identifier.

2. The method according to claim 1, wherein the obtaining, by the wireless access device, a second service packet based on the first service packet comprises:
   obtaining, by the wireless access device, a first identifier based on the first service packet, wherein the first identifier is used to identify a service of a subscriber; and
   obtaining, by the wireless access device, the second service packet based on the first identifier, the first service packet, and a correspondence comprising the network slice identifier and the first identifier, the second service packet comprises a tunnel encapsulation comprising the network slice identifier.

3. The method according to claim 2, wherein the first identifier comprises at least one of a service identifier or an identifier of the subscriber.

4. The method according to claim 1, wherein the obtaining, by the wireless access device, a second service packet based on the first service packet comprises:
   obtaining, by the wireless access device, the network slice identifier from the first service packet, wherein the first service packet comprises the network slice identifier; and
   performing, by the wireless access device, a tunnel encapsulation on the first service packet, to obtain the second service packet, wherein the tunnel encapsulation comprises the network slice identifier.

5. The method according to claim 2, wherein the tunnel encapsulation comprises an internet protocol version 6 (IPv6) extension header comprising the network slice identifier.

6. The method according to claim 5, wherein the IPv6 extension header comprises a hop-by-hop options header comprising an option type and option data, the option type is used to identify a type of a network slice identifier, and the option data is used to carry the network slice identifier.

7. The method according to claim 2, wherein the tunnel encapsulation comprises a general packet radio service tunneling protocol user plane (GTP-U) header comprising extension header content, and the extension header content is used to carry the network slice identifier.

8. An apparatus for obtaining a network slice identifier, wherein the apparatus is disposed in a wireless access device, and the apparatus comprising:
a processor; and
a non-transitory computer-readable storage medium coupled to the processor and storing programming instructions for execution by the processor, the programming instructions instruct the apparatus to:
receive a first service packet;
obtain a second service packet based on the first service packet, wherein the second service packet comprises the first service packet and a network slice identifier; and
send the second service packet based on the network slice identifier.

9. The apparatus according to claim 8, wherein the programming instructions instruct the apparatus to:
obtain a first identifier based on the first service packet, wherein the first identifier is used to identify a service of a subscriber; and
obtain the second service packet based on the first identifier, the first service packet, and a correspondence comprising the network slice identifier and the first identifier, the second service packet comprises a tunnel encapsulation comprising the network slice identifier.

10. The apparatus according to claim 9, wherein the first identifier comprises at least one of a service identifier or an identifier of the subscriber.

11. The apparatus according to claim 8, wherein the programming instructions instruct the apparatus to:
obtain the network slice identifier from the first service packet, wherein the first service packet comprises the network slice identifier; and
perform a tunnel encapsulation on the first service packet, to obtain the second service packet, wherein the tunnel encapsulation comprises the network slice identifier.

12. The apparatus according to claim 9, wherein the tunnel encapsulation comprises an internet protocol version 6 (IPv6) extension header comprising the network slice identifier.

13. The apparatus according to claim 12, wherein the IPv6 extension header comprises a hop-by-hop options header comprising an option type and option data, the option type is used to identify a type of a network slice identifier, and the option data is used to carry the network slice identifier.

14. The apparatus according to claim 9, wherein the tunnel encapsulation comprises a general packet radio service tunneling protocol user plane (GTP-U) header comprising extension header content, and the extension header content is used to carry the network slice identifier.

15. An apparatus for obtaining a network slice identifier, wherein the apparatus is disposed in a forwarding device, the apparatus comprising:
a processor; and
a non-transitory computer-readable storage medium coupled to the processor and storing programming instructions for execution by the processor, the programming instructions instruct the processor to:
receive a second service packet, wherein the second service packet comprises a first service packet and a network slice identifier;
obtain the network slice identifier from the second service packet; and
lead, based on the network slice identifier, the second service packet into a network slice corresponding to the network slice identifier.

16. The apparatus according to claim 15, wherein the programming instructions instruct the apparatus to:
obtain, based on the network slice identifier and a correspondence, a network resource corresponding to the network slice; and
send the second service packet by using the network resource corresponding to the network slice.

17. The apparatus according to claim 15, wherein the second service packet comprises an internet protocol version 6 (IPv6) extension header comprising the network slice identifier.

18. The apparatus according to claim 17, wherein the IPv6 extension header comprises a hop-by-hop options header comprising an option type and option data, the option type is used to identify a type of a network slice identifier, and the option data is used to carry the network slice identifier.

19. The apparatus according to claim 15, wherein the second service packet comprises a tunnel encapsulation, and wherein the tunnel encapsulation comprises a general packet radio service tunneling protocol user plane (GTP-U) header comprising extension header content, and the extension header content is used to carry the network slice identifier.

* * * * *